(12) United States Patent
Holland-Letz

(10) Patent No.: US 10,011,274 B2
(45) Date of Patent: Jul. 3, 2018

(54) PARKING ASSISTANCE SYSTEM AND METHOD FOR PARKING A VEHICLE IN A PARKING GARAGE

(71) Applicant: ADC Automotive Distance Control Systems GmbH, Lindau (DE)

(72) Inventor: Guenter Holland-Letz, Paderborn (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 0 days.

(21) Appl. No.: 15/102,716

(22) PCT Filed: Dec. 16, 2014

(86) PCT No.: PCT/DE2014/200718
§ 371 (c)(1),
(2) Date: Jun. 8, 2016

(87) PCT Pub. No.: WO2015/096838
PCT Pub. Date: Jul. 2, 2015

(65) Prior Publication Data
US 2016/0311429 A1    Oct. 27, 2016

(30) Foreign Application Priority Data

Dec. 23, 2013  (DE) .......... 20 2013 011 575
Dec. 23, 2013  (DE) .......... 20 2013 011 576

(51) Int. Cl.
*B60W 30/06* (2006.01)
*B62D 15/02* (2006.01)
(Continued)

(52) U.S. Cl.
CPC ............ *B60W 30/06* (2013.01); *B60W 10/18* (2013.01); *B60W 10/20* (2013.01); *B60W 40/02* (2013.01); *B62D 15/0285* (2013.01)

(58) Field of Classification Search
CPC ...... B60W 30/06; B60W 10/18; B60W 10/20; B60W 40/02; B62D 15/0285;
(Continued)

(56) References Cited

U.S. PATENT DOCUMENTS 6,170,591 B1 * 1/2001 Sakai ................. B62D 15/0285
                                                180/204
6,424,895 B1    7/2002 Shimizu et al.
(Continued)

FOREIGN PATENT DOCUMENTS

DE    102007049709    4/2009
DE    102008004633    7/2009
(Continued)

OTHER PUBLICATIONS

International Search Report of the International Searching Authority for International Application PCT/DE2014/200718, dated Jun. 10, 2015, 3 pages, European Patent Office, HV Rijswijk, Netherlands.
(Continued)

Primary Examiner — Abby Y Lin
(74) Attorney, Agent, or Firm — W. F. Fasse

(57) ABSTRACT

A parking assistance system for parking a vehicle in a parking garage includes a measuring sensor system, with at least one sensor which is arranged on at least one end of the vehicle, and which measures a contour of the parking garage. The parking assistance system further includes a steering control unit, which automatically steers the vehicle from a stopping point into a parking end position inside the parking garage.

19 Claims, 3 Drawing Sheets

(51) Int. Cl.
*B60W 40/02* (2006.01)
*B60W 10/18* (2012.01)
*B60W 10/20* (2006.01)

(58) Field of Classification Search
CPC ............. B62D 15/027; B62D 15/0275; B62D 15/028; B62D 15/025; B62D 15/02; B62D 15/021; B62D 15/029; B62D 15/0295; G01C 21/00; G05D 1/00; G08G 1/14–1/149
See application file for complete search history.

(56) References Cited

U.S. PATENT DOCUMENTS

| | | | |
|---|---|---|---|
| 6,564,123 B2 | 5/2003 | Hahn et al. | |
| 8,374,749 B2 | 2/2013 | Tanaka | |
| 9,511,723 B2* | 12/2016 | Eckert | B60T 7/22 |
| 2002/0091479 A1* | 7/2002 | Maruko | B60T 7/22 |
| | | | 701/96 |
| 2008/0154464 A1* | 6/2008 | Sasajima | B62D 15/0285 |
| | | | 701/42 |
| 2008/0297374 A1* | 12/2008 | Usami | B60Q 1/143 |
| | | | 340/935 |
| 2009/0128364 A1 | 5/2009 | Lee | |
| 2010/0219010 A1* | 9/2010 | Kadowaki | B62D 15/0285 |
| | | | 180/204 |
| 2012/0310481 A1* | 12/2012 | Kanning | B62D 15/0285 |
| | | | 701/41 |
| 2013/0085637 A1 | 4/2013 | Grimm et al. | |
| 2014/0163862 A1* | 6/2014 | Choi | G01C 21/26 |
| | | | 701/400 |
| 2016/0288833 A1* | 10/2016 | Heimberger | B62D 15/027 |

FOREIGN PATENT DOCUMENTS

| | | |
|---|---|---|
| DE | 102008019346 | 9/2009 |
| DE | 102009041587 | 3/2011 |
| DE | 102009057837 | 6/2011 |
| DE | 102011107974 | 1/2013 |
| EP | 1 512 611 | 3/2005 |
| EP | 2 008 915 | 12/2006 |
| EP | 2 322 401 | 5/2011 |
| JP | 2011-141854 A | 7/2011 |
| WO | WO 2014/076071 | 5/2014 |

OTHER PUBLICATIONS

PCT International Preliminary Report on Patentability including English Translation of PCT Written Opinion of the International Searching Authority for International Application PCT/DE2014/200718, dated Jun. 28, 2016, 8 pages, International Bureau of WIPO, Geneva, Switzerland.

* cited by examiner

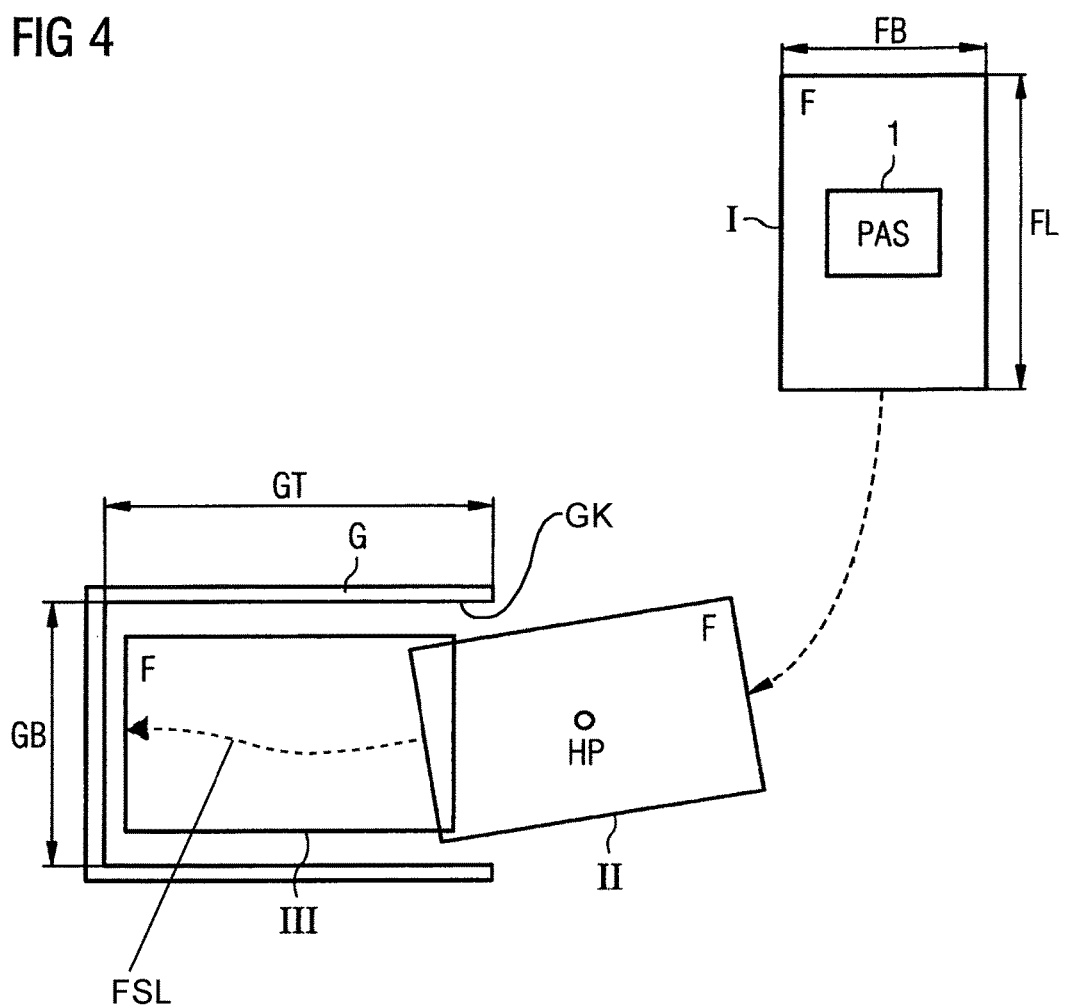

PARKING ASSISTANCE SYSTEM AND METHOD FOR PARKING A VEHICLE IN A PARKING GARAGE

FIELD OF THE INVENTION

The invention relates to a parking assistance system and a method for automatically parking a vehicle in a parking garage.

BACKGROUND INFORMATION

In many cases, parking a vehicle, in particular a road vehicle, for example a car or a truck, in a parking garage constitutes a demanding driving maneuver for the driver of the vehicle due to the relatively small size of the parking garage. In particular, the relatively small width of standard garages makes it necessary to park a vehicle relatively close to the wall of a parking garage. This need to park vehicles close to the wall is also due to the fact that the dimensions of the bodies of average vehicles have increased and often the available parking space in a parking garage is used for other objects, for example for bicycles or garden implements. As a result, however, the space available for getting in and out of the vehicle is reduced and there is a risk of the vehicle body touching a wall of the parking garage during the parking maneuver or on opening vehicle doors, which can result in paint damage to the body of the vehicle. In particular, during reversing of the vehicle into a parking garage in order to park, it is particularly difficult for the driver of the vehicle to comply with the necessary distance from the garage walls, as the driver only has a restricted view of the entrance to the parking garage.

Conventional vehicles are increasingly equipped with measuring sensor systems, in particular ultrasonic sensors, for measuring distances. In the event that a particular distance is fallen short of, the driver receives an audible warning and, possibly, a visual indication of the ultrasonic measuring field in a display unit of a driver user interface. Such a conventional visual or audible display does not, however, allow the vehicle to be positioned exactly and reliably inside a parking garage within a narrow and/or small distance range of less than 10 cm.

SUMMARY OF THE INVENTION

It is therefore one of the objects of this invention to provide a device and a method which guarantees reliable parking of a vehicle in a parking garage.

This object can be achieved according to an embodiment of the invention by a parking assistance system having the features as set forth herein.

Therefore, according to a first aspect of the invention, a parking assistance system for parking a vehicle in a parking garage is provided comprising a measuring sensor system which is arranged on at least one of the ends of the vehicle and which is used to measure a contour of the parking garage and comprising a steering control unit which automatically steers the vehicle starting from a stopping point into a parking end position inside the parking garage.

The vehicle is reliably prevented from touching a wall of the parking garage or colliding with a garage wall by means of the parking assistance system according to the invention. In addition, the vehicle is automatically steered starting from the stopping point without any intervention on the part of the driver. As a result, the parking maneuver is simplified for the driver of the vehicle.

In one possible embodiment of the parking assistance system according to the invention, the measuring sensor system of the parking assistance system surveys the contour of the garage until the vehicle reaches the stopping point located in an entrance area of the parking garage.

In another possible embodiment of the parking assistance system according to the invention, a calculation unit of the parking assistance system determines a position of the vehicle, in particular an angular position of the vehicle, at the stopping point relative to the parking garage, by means of the surveyed contour of the parking garage.

In another possible embodiment of the parking assistance system according to the invention, the calculation unit of the parking assistance system calculates, on the basis of the determined position of the vehicle at the stopping point relative to the parking garage, at least one lane line, i.e. driving path line, starting from the stopping point up to a suitable parking end position inside the parking garage, in which the body of the vehicle is preferably aligned largely parallel to at least one wall of the parking garage.

In another possible embodiment of the parking assistance system according to the invention, the steering control unit of the parking assistance system automatically steers the vehicle starting from the stopping point into the parking end position inside the parking garage in accordance with a calculated lane line.

In another possible embodiment of the parking assistance system according to the invention, the lane lines calculated by the calculation unit of the parking assistance system are indicated to the driver of the vehicle on a display of a user interface of the parking assistance system, wherein one of the displayed lane lines can be selected by the driver by means of the user interface, wherein the steering control unit of the parking assistance system automatically steers the vehicle starting from the stopping point into the parking end position inside the parking garage in accordance with the lane line selected by the driver.

In another possible embodiment of the parking assistance system according to the invention, the calculation unit of the parking assistance system calculates possible lane lines as a function of a measured distance between the stopping point and the entrance to the parking garage.

In another possible embodiment of the parking assistance system according to the invention, the calculation unit of the parking assistance system calculates possible lane lines as a function of a stored length of the vehicle and/or a stored width of the vehicle.

In another possible embodiment of the parking assistance system according to the invention, the calculation unit of the parking assistance system calculates possible lane lines as a function of a depth which is stored or detected by sensors and/or as a function of a width of the parking garage, which is stored or detected by sensors.

In another possible embodiment of the parking assistance system according to the invention, the calculation unit calculates possible lane lines as a function of the surveyed contour of the parking garage.

In another possible embodiment of the parking assistance system according to the invention, the stopping point located in the entrance area of the parking garage is marked.

In another possible embodiment of the parking assistance system according to the invention, the stopping point located in the entrance area of the parking garage can be detected by a sensor of the parking assistance system.

In another possible embodiment of the parking assistance system according to the invention, the moment the vehicle reaches the stopping point is audibly or visually indicated and/or notified to the driver of the vehicle by means of a user interface of the parking assistance system.

In another possible embodiment of the parking assistance system according to the invention, the lane line used by the steering control unit for steering the vehicle into the parking end position is stored in a data storage unit of the parking assistance system.

In another possible embodiment of the parking assistance system according to the invention, the lane line which has been used and stored is read out from the data storage unit of the parking assistance system by the steering control unit and the vehicle is subsequently automatically steered starting from the parking end position out of the parking garage in accordance with the lane line which is read out.

In another possible embodiment of the parking assistance system according to the invention, if the calculation unit of the parking assistance system cannot calculate a possible lane line to a suitable parking end position inside the parking garage starting from the determined position of the vehicle at the stopping point, the driver of the vehicle is informed of a necessary alteration of the position of the vehicle relative to the parking garage.

In another possible embodiment of the parking assistance system according to the invention, the measuring sensor system of the parking assistance system comprises an ultrasonic sensor system.

In another possible embodiment of the parking assistance system according to the invention, the measuring sensor system of the parking assistance system comprises a laser sensor system.

In another possible embodiment of the parking assistance system according to the invention, the measuring sensor system of the parking assistance system is arranged on a front seat passenger's side at the rear end of the vehicle and is aligned transversely to the driving direction of the vehicle.

In another possible embodiment of the parking assistance system according to the invention, the measuring sensor system of the parking assistance system constantly and/or continually detects a distance of the vehicle from a wall of the parking garage during the parking of the vehicle in the parking garage.

In another possible embodiment of the parking assistance system according to the invention, a braking control unit of the parking assistance system automatically activates a wheel braking system of the vehicle, in the event that a predetermined safety distance between the vehicle and a wall of the parking garage is fallen short of.

In another possible embodiment of the parking assistance system according to the invention, the calculation unit of the parking assistance system calculates a necessary brake retardation time and/or brake retardation force, based on the distance of the vehicle from the wall of the parking garage, which is detected by sensors, and based on the speed of the vehicle, in order to comply with the safety distance.

In another possible embodiment of the parking assistance system according to the invention, the braking control unit of the parking assistance system controls the wheel braking system of the vehicle as a function of the calculated brake retardation time and/or brake retardation force.

According to a further aspect of the invention a garage parking assistance system is also provided, which controls the vehicle in a self-guiding manner from a stopping point into a parking position parallel to a garage wall, wherein the garage parking assistance system is characterized in that a measuring sensor system is arranged aligned transversely to the driving direction on the front seat passenger's side at the rear end of the vehicle.

According to a further aspect of the invention, an approach protection mechanism is provided, which prevents the vehicle falling short of a safe wall distance, wherein the approach protection mechanism is characterized in that the wall distance detected by a sensor in the case of a predefined minimum distance produces a stop signal in the evaluation electronics, said stop signal acting on the existing wheel braking system, so that the vehicle comes to a stop within the safety distance.

A further aspect of the invention provides a method for parking a vehicle in a parking garage having the features set forth herein.

The invention therefore provides a method for parking a vehicle in a parking garage comprising the following steps:

Measuring of a contour of the parking garage until the vehicle reaches a stopping point located in an entrance area of the parking garage, Determining of a position of the vehicle at the stopping point relative to the parking garage from the measured contour of the parking garage, Calculating of at least one lane line from the stopping point to a parking end position inside the parking garage on the basis of the determined position of the vehicle relative to the parking garage, and Automatic steering of the vehicle starting from the stopping point up to the parking end position inside the parking garage in accordance with the calculated lane line.

In one possible embodiment of the method according to the invention, the lane line is stored in a data storage unit and the vehicle is automatically steered starting from the parking end position out of the parking garage again in accordance with the lane line read out from the data storage unit.

In another possible embodiment of the method according to the invention, a distance of the vehicle from a wall of the parking garage is constantly detected by sensors during the steering of the vehicle and, in the event that a safety distance between the vehicle and the garage wall is fallen short of, the vehicle is automatically braked.

In another possible embodiment of the method according to the invention, possible lane lines are calculated as a function of a measured distance between the stopping point and an entrance to the parking garage and/or as a function of a stored length of the vehicle and/or a stored width of the vehicle and/or as a function of a depth of the parking garage, which is stored or detected by sensors, and/or a width of the parking garage, which is stored or detected by sensors, and/or as a function of the surveyed contour of the parking garage.

In one possible embodiment of the method according to the invention, the calculated possible lane lines are clothoid paths.

In another possible embodiment of the method according to the invention, the steps of the method are carried out in real time during the parking maneuver.

According to a further aspect of the invention, a control program for controlling a parking maneuver of a vehicle having program commands which carry out the method according to the invention is provided.

In one possible embodiment, this parking control program is executed by a microprocessor in the control system of a parking assistance system.

In one possible embodiment, the control program is read out from a program storage device of the parking assistance system.

BRIEF DESCRIPTION OF THE DRAWINGS

In addition, possible embodiments of the parking assistance system according to the invention and of the method for parking a vehicle in a parking garage according to the invention will be explained in more detail below, with reference to the attached figures, wherein:

FIG. 4 shows a schematic view of a parking maneuver in order to explain the operating method of the parking assistance system according to the invention and of the method according to the invention.

DETAILED DESCRIPTION OF EXAMPLE EMBODIMENTS OF THE INVENTION

Figure 1:
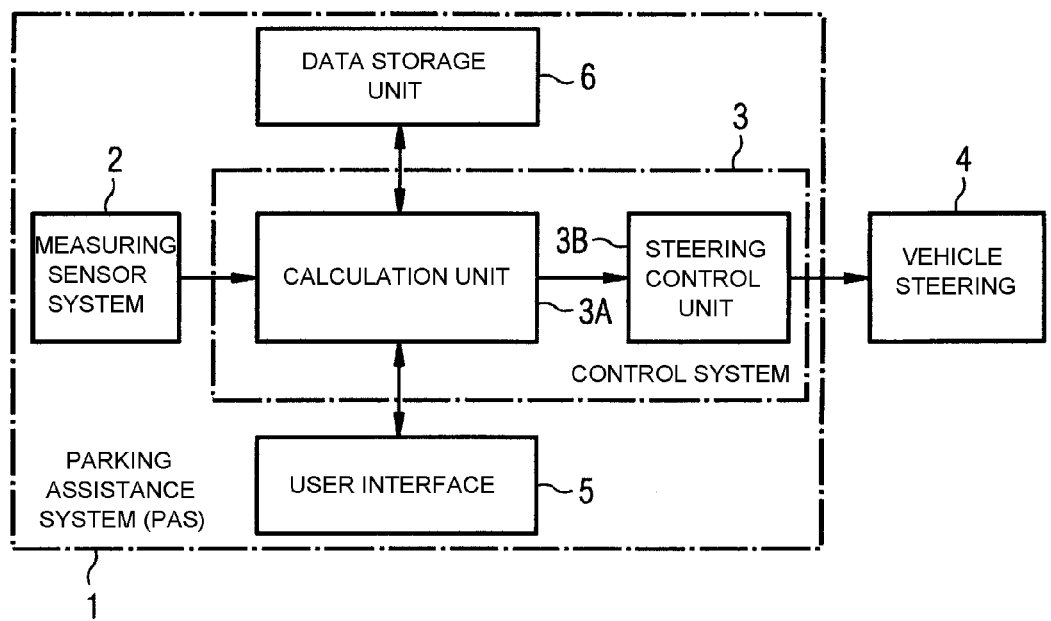
FIG. 1 shows a block wiring diagram of a possible embodiment of the parking assistance system according to the invention.

As can be seen from FIG. 1, a parking assistance system 1 according to the invention comprises, in the illustrated embodiment example, a measuring sensor system 2 which supplies measuring data or measuring signals to a control system 3 of the parking assistance system 1. The measuring sensor system 2 is preferably arranged on one end of the vehicle. In one possible embodiment, the measuring sensor system is designed to measure a contour of a vehicle parking garage. The measuring sensor system 2 comprises, in one possible embodiment, an ultrasonic system and/or a laser system. The ultrasonic system comprises, in one possible embodiment, a plurality of ultrasonic sensors which are mounted on the body of the vehicle F. As shown in FIG. 1, the control system 3 contains, in the illustrated embodiment example, a calculation unit 3A and a steering control unit 3B. The steering control unit 3B in the parking assistance system 1 according to the invention steers the vehicle F starting from a stopping point HP into a parking end position inside the parking garage G. The measuring sensor system 2 preferably surveys the contour of the garage GK until the vehicle reaches the stopping point HP located in an entrance area of the parking garage G. The measuring sensor system 2 measures the surrounding contour of the garage as the vehicle drives to the stopping point HP in the entrance area of the parking garage G. The calculation unit 3A of the control system 3 uses the measured contour of the parking garage G to calculate a position of the vehicle F at the stopping point HP relative to the parking garage G. The calculation unit 3A preferably uses the measured contour of the garage GK to calculate the position of the angular position of the vehicle F from the stopping point located at the garage entrance. The calculation unit 3A preferably calculates, on the basis of the determined position of the vehicle F at the stopping point HP, possible lane lines i.e. driving path lines, or travel curves FSL starting from the stopping point HP up to a suitable parking end position inside the parking garage G as shown schematically in FIG. 4. FIG. 4 shows a vehicle F, for example a car or a truck, which has a parking assistance system 1 according to the invention. The driver of the vehicle F first manually steers the vehicle F, for example backwards, as shown in FIG. 4, to a predefined stopping point HP. In one possible embodiment, the fact that the vehicle has reached the stopping point HP is audibly and/or visually indicated and/or notified to the driver of the vehicle F by means of a user interface inside the vehicle F. FIG. 4 shows the initial position I of the vehicle F and the stopping position II of the vehicle F at the stopping point HP. Starting from the stopping position II, the vehicle F is subsequently automatically steered by the steering control unit 3B of the control system 3 of the parking assistance system 1 into the parking end position III. To this end, the steering control unit 3B of the parking assistance system 1, as shown in FIG. 1, controls a vehicle steering device 4 inside the vehicle F. As already mentioned, the stopping point HP is located in an entrance area of the parking garage G. The driver of the vehicle F drives the vehicle F himself manually to the entrance to the parking garage G, wherein the end of the vehicle, for example the back of the vehicle, during reverse parking, has preferably passed the entrance to the parking garage G, for example by 0.5 to 1 m, with at least one sensor of the measuring sensor system 2. At the entrance the sensor of the measuring sensor system 2 detects the position starting from the end of the vehicle, in particular the back of the vehicle, relative to the contour GK of the garage entrance G. The calculation unit 3A of the control system 3 receives the corresponding sensor data and preferably carries out a digital signal evaluation. The distance of the vehicle F from the garage entrance, the distance from a projection of the garage entrance and, based on a plurality of distance values, an angular position of the vehicle F relative to at least one wall of the garage G is preferably calculated from the digital signal evaluation. The sensor data of the measuring sensor system 2 is preferably supplied by ultrasonic sensors, an ultrasonic sensor system or by sensors of a laser system. The advantage of a laser measuring sensor system is that precise laser values, which can be more easily evaluated, are produced. The calculation unit 3A calculates, on the basis of the determined relative position of the vehicle F to the garage G at the stopping point HP, various possible lane lines or travel curves FSL, in order to steer the vehicle F starting from the stopping point HP to a suitable parking end position inside the vehicle garage G. In the suitable parking end position the body of the vehicle F is aligned as far as possible parallel to at least one wall of the parking garage G, as shown in FIG. 4. The steering control unit 3B of the control system 3 of the parking assistance system 1 steers the vehicle F starting from the stopping point HP into the parking end position inside the parking garage G in accordance with a calculated lane line or travel curve FSL. In one possible embodiment, a plurality of lane lines or travel curves FSL are indicated to the driver of the vehicle F by means of a display of a user interface 5 by the calculation unit 3A of the parking assistance system 1. The driver of the vehicle F subsequently selects one of the displayed lane lines FSL. The steering control unit 3B of the parking assistance system 1 subsequently steers the vehicle F starting from the stopping point HP into the parking end position inside the parking garage G in accordance with the selected lane line FSL. The calculation unit 3A of the parking assistance system 1 calculates the lane lines FSL, in one possible embodiment, as a function of a measured distance between the stopping point HP and the garage entrance. In addition, the calculation unit 3A can calculate the lane lines FSL as a function of a stored length FL and a stored width FB of the vehicle F. In another possible embodiment, the calculation unit 3A of the control system 3 additionally calculates the lane lines FSL as a function of a depth GT which is stored or detected by sensors and/or as a function of a width GB of the parking garage G, which is stored or detected by sensors. In another possible embodiment, the calculation unit 3A calculates the lane lines FSL as a function of the surveyed contour GK of the parking garage G. The distance covered from the stopping point HP into the depths of the parking garage G can be calculated, in one possible embodiment, from a measured distance between the stopping point HP and the garage entrance and a stored length FL of the vehicle F plus overtravel. Various lane lines FSL into the parking end position are calculated from the determined values. The calculated lane lines FSL are indicated to the driver by means of a display of the user interface 5 of the parking assistance system 1 for selection purposes.

If the calculation unit 3A of the parking assistance system 1 is not able to calculate a possible reliable lane line FSL to a suitable parking end position inside the parking garage G using the current, determined relative position of the vehicle F at the stopping point HP, this is preferably indicated to the driver by means of a display of the user interface 5. In the process, the driver is informed of the necessary alteration of the position of the vehicle F relative to the garage G. If, for example, the vehicle F is too close to a projection of the entrance to the parking garage G in the stopping position at the stopping point HP, there may not be any space for countersteering. If, however, the angle to the garage wall is too great, the back of the vehicle F would hit a wall of the garage G. In this case, the parking assistance system 1 may indicate to the driver that the vehicle F has to be moved forward again. In one possible embodiment, the display of the parking assistance system 1 indicates guide values for moving the vehicle F forward again, if the calculation of the lane lines has indicated an unusable initial and/or stopping position II. If the vehicle F is located at too great a lateral distance from a projection of the parking garage G, it is necessary to steer out correspondingly wide, in order to get as close as possible to the garage wall. This requires a corresponding amount of free space on the driver's side, so that it is also necessary to move the vehicle F forward again.

The calculation unit 3A of the parking assistance system 1 determines possible lane lines FSL for a position parallel to the wall and can indicate these to the driver on a display of the user interface 5. In one possible embodiment, the calculation unit 3A uses clothoid paths in order to calculate the movement of the vehicle F over a large area. In one possible embodiment, path corrections are still being calculated and executed as the vehicle approaches a wall of the parking garage G, so that the vehicle reaches a parallel position a short distance from the wall.

The parking end position is preferably reached on the first approach, in particular because the free depth of the parking garage G relative to the vehicle length FL is often limited and maneuvering of the vehicle F does not result in a further improvement. The front of the vehicle F is preferably brought to a stop with as little overtravel as possible to the projection of the garage entrance. Starting from a minimum value, a wall distance can be preset by the driver by means of the user interface 5. In one possible embodiment, the dimensions of the vehicle F, in particular the length FL and/or the width FB of the vehicle F, can be stored in a data storage unit 6 of the parking assistance system 1 in the factory settings for the vehicle F. The length FL of the vehicle F minus the projection plus the stopping position plus overtravel produces the driving route to automatically be steered in the longitudinal direction of the vehicle F. The overtravel, in this case, depends on a lateral distance in the initial position and results from the calculation of the lane line which, for its part, depends on the possible dynamics of controlling the movement. In one possible embodiment, the various calculated lane lines FSL are intermediately stored in the data storage unit 6 of the parking assistance system 1 and indicated to the driver for selection on a display of the user interface 5. If the driver has chosen and/or selected a reliable lane line FSL, the steering wheel of the vehicle F is preferably released and the steering control unit 3B of the vehicle F takes over the steering of the vehicle F starting from the stopping position II up to the parking end position III, as shown in FIG. 4.

In one possible embodiment, the selected lane line FSL, which is used to automatically steer the vehicle F to the parking end position, is stored in the longer term in the data storage unit 6 and/or the other determined lane lines FSL in the data storage unit 6 are deleted. The lane line FSL used is preferably stored for the entire duration of the parking of the vehicle F inside the parking garage G. In one possible embodiment, following starting and/or activation of the vehicle F in the parking garage G, the stored, used lane line FSL is read out again from the data storage unit 6 and is used by the steering control unit 3B to steer the vehicle F out starting from the parking end position. In this embodiment, the vehicle F is therefore also automatically steered without any intervention on the part of the driver during removal of the vehicle F from the vehicle garage G up to the stopping position II. As soon as the vehicle F has reached the stopping position II and/or the stopping point HP, the driver can take over the steering of the vehicle F and manually steer the vehicle starting from the stopping position II.

In one possible embodiment of the parking assistance system 1 according to the invention, the driver of the vehicle F can select between a forward parking maneuver and a reverse parking maneuver. In this case, the parking assistance system 1 according to the invention supports the driver, depending on whether the driver has selected a forward parking maneuver or a reverse parking maneuver by means of a user interface of the parking assistance system 1. In one possible embodiment, different sensors of the measuring sensor system 2 are activated and the measuring data and/or sensor data thereof is/are evaluated as a function of the selected parking maneuver. In one possible embodiment, the measuring sensor system 2 comprises measuring sensors on the front seat passenger's side of the vehicle F at the rear end of the vehicle F, wherein the measuring sensor system 2 is aligned rather to the driving direction of the vehicle F. In particular, the measuring sensor system 2 supports a reverse parking maneuver of the vehicle F into a parking garage G. In one possible embodiment, an associated control program is provided, which can be executed by the control system 3 of the parking assistance system 1, both for the reverse parking maneuver and for the forward parking maneuver. In order to support forward parking a front sensor is preferably provided at the anterior or front side of the vehicle F. The corresponding control program also takes account, during steering towards a garage wall, of a safety distance from the entrance into the parking garage G, wherein the front section of the vehicle F is controlled at a small parallel distance from the garage wall. The parallel position which can be reached by the vehicle F is dependent on the initial position and on a free driving route into the depths of the parking garage G. For example, driving the vehicle out again is stored as a travel curve in the data storage unit 6 of the parking assistance system 1 and is made available on engaging a reverse gear. Also on removing and/or on driving out, the vehicle F preferably stops at an intermediate point and/or stopping point HP when the front sensor has, for example, passed the garage entrance by 0.5 to 1 m. The travel curve and/or lane line FSL and the end position which can be reached are also preferably indicated again on removing the vehicle for clearance by the driver. The user manual provided with the vehicle F will, for example, recommend reverse parking in the parking garage G with the assistance of the parking assistance system 1 according to the invention, for example, for a position parallel and close to the wall.

In one possible embodiment, an audible or visual warning is switched on each time the vehicle is reversed, wherein the parking steering assistant according to the invention is preferably activated separately, for example by pressing a button on the user interface 5 or by being selected with the aid of a rotary or push button. The driver can preferably activate a button or a rotary and/or push button to choose between normal on-street parking and a garage parking maneuver. In one possible embodiment, the selection of a reverse parking maneuver or forward parking maneuver is automatically made on the basis of sensor data which is supplied by a rear or a front lateral sensor.

As shown in FIG. 4, the driver of the vehicle F first manually steers the vehicle F from the initial position I into the stopping position II. In one possible embodiment, a stopping point HP is indicated by a marking on a wall of the parking garage G, which is located opposite, for example, the rear mirror of the vehicle F as a reference point, wherein the ultrasonic measurement field is also located in the field of view and indicates the distance with a rear limit. A front wall distance can be displayed, for example, with a front ultrasonic sensor. In another possible embodiment, the stopping point HP can be detected by a sensor of the parking assistance system 1. The automatic control system serves to make it possible for the driver to direct his attention to a display and/or a screen. If the aim is to achieve particularly short overtravel to the garage entrance, the front section of the vehicle F can approach the garage wall with the wheel position for steering and not reach a straight position again in the end position. In this case, the vehicle F is stopped before the front distance becomes too small. To this end, a front sensor of the parking assistance system 1 is preferably provided to control a brake of a wheel braking system. In one possible embodiment, a steering maneuver which steers past an entrance projection of the parking garage G is stored by exiting the parking garage G.

As shown in FIG. 4, the driver of the vehicle F can approach the stopping point HP in a circular arc in order to reach the optimum stopping position. To this end, an illustration with a tolerance area and corresponding information can be incorporated into the user manual for the vehicle F. A stopping position, which takes the vehicle past the garage entrance close to the projection in a flat angle to the garage wall, produces the smallest steering corrections. If the vehicle has to be moved forward, a correction guide value for the lateral distance and the angle can be graphically displayed in a display and/or a screen of the user interface 5 of the parking assistance system 1, wherein the new stopping point HP is again signaled audibly. In one possible embodiment, a reversing camera with displayed auxiliary driving lines and additional auxiliary lines can be provided as an aid for the angle to the garage wall and for the distance from the garage entrance, if the vehicle F has to approach the garage again.

Figure 2:
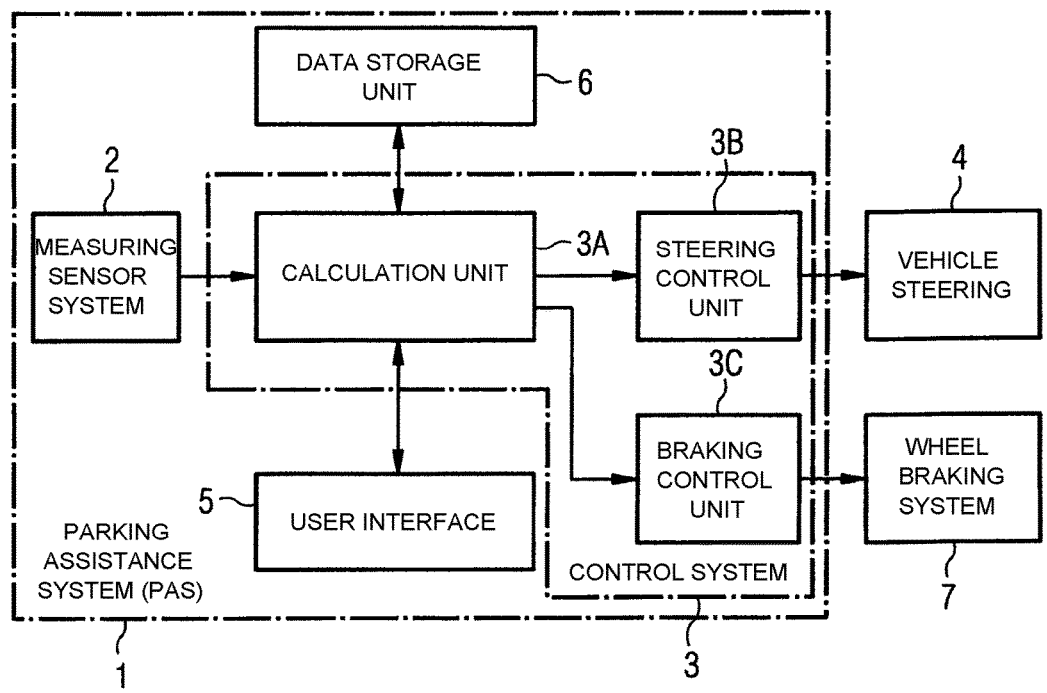
FIG. 2 shows a block wiring diagram for illustrating a further embodiment example of a parking assistance system according to the invention.

FIG. 2 shows another embodiment example of a parking assistance system 1 according to the invention. In this embodiment, the parking assistance system 1 additionally comprises a braking control unit 3C which controls a wheel braking system 7 of the vehicle F. In one possible embodiment, the measuring sensor system 2 of the parking assistance system 1 constantly and/or continually detects a distance of the vehicle F from a wall of the parking garage G during parking. The braking control unit 3C of the control system 3 inside the parking assistance system 1 automatically activates the wheel braking system 7 of the vehicle F, in the event that a safety distance between the vehicle F and a wall of the parking garage G is fallen short of. In one possible embodiment, the calculation unit 3A of the parking assistance system 1 calculates a necessary brake retardation time and/or brake retardation force, based on the distances of the vehicle F from the garage wall and the current speed of the vehicle detected by sensors, in order to comply with the safety distance. In one possible embodiment, the safety distance can be configured and/or adjusted by means of an input unit of the user interface 5 by the driver of the vehicle F. The braking control unit 3C of the parking assistance system 1 controls the wheel braking system 7 of the vehicle F, in one possible embodiment, as a function of the calculated brake retardation time and/or brake retardation force. In this way, the parking assistance system 1 according to the invention provides an approach protection mechanism which prevents a safe distance from the wall being fallen short of. The wall distance detected by a sensor preferably produces a stop signal, at a predefined minimum distance, by means of evaluation electronics of the control system 3, said stop signal acting on the existing wheel braking system 7, so that the vehicle F is brought to a stop within a safety distance. In one possible embodiment, the measuring sensor system 2 comprises, to this end, measuring sensors which are opposite the driver's side, wherein they are preferably positioned so far to the side at the front and rear of the vehicle F that the small distance from the wall is located in a sufficiently precise measuring range. These sensors are preferably ultrasonic sensors. In one possible embodiment, the speed of the vehicle F and an approach angle to the garage wall are determined by means of the control software of the evaluation electronics and the stop command is calculated therefrom with the brake retardation time before reaching a critical wall distance. In one possible embodiment, the wheels of the vehicle F are braked by means of an ESP unit. Alternatively, a handbrake which can be operated electrically can also be controlled by the braking control unit 3C of the control system. In one possible embodiment, sensors are positioned on the front seat passenger's side at the front and rear and further to the side. In addition, additional sensors can be provided transversely to the driving direction. The sensor mounted at the rear end of the vehicle and/or back of the vehicle, in particular the ultrasonic sensor, only operates when the vehicle F is reversing into a parking space. During subsequent steering of the vehicle F, the sensor data supplied by the front sensor, in particular ultrasonic sensor, can be taken into consideration and evaluated, in order to prevent a collision with the lateral projection of the entrance to the parking garage G and in order to prevent contact with a garage wall. In the case of a forward parking maneuver the sensor data supplied by a front sensor, in particular an ultrasonic sensor, which is mounted on a front seat passenger's side of the vehicle F, is mainly evaluated. In one possible embodiment, the measuring tolerance and the resolution of the measurement is in a range of approximately ±1 cm. The control software of the control system 3 can, in one possible embodiment, determine an approach angle from constant distance measurements and, with the approach speed and the determined brake retardation, carry out a braking intervention with the aid of the wheel braking system 7. A user manual of the vehicle F can indicate limits for approach angles and speeds, up to which the braking assistance function can be guaranteed. If these limits are exceeded, in one possible embodiment, premature braking of the vehicle F can be triggered. In another possible embodiment, the tolerance of the braking action, for example as a consequence of water on brake discs, can also be taken into consideration for braking the wheel braking system 7 as a function of the driving speed and an approach angle.

Figure 3:
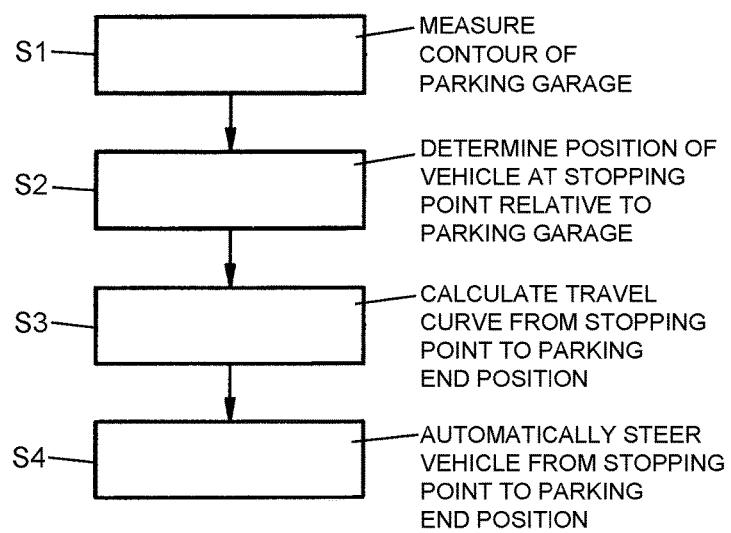
FIG. 3 shows a flow diagram for illustrating an embodiment example of the method for parking a vehicle in a parking garage according to the invention.

FIG. 3 shows a flow chart for illustrating an embodiment example of a method for parking a vehicle F in a parking garage G according to the invention.

In a first step S1, a contour GK of the parking garage G is measured until the vehicle reaches a stopping point HP located in an entrance area of the parking garage G.

In a further step S2, a position of the vehicle F at the stopping point HP relative to the parking garage G is determined from the measured contour of the garage.

In a further step S3, at least one lane line and/or travel curve FSL is calculated from the stopping point HP to a parking end position inside the parking garage G on the basis of the determined position of the vehicle F.

In a further step S4, the vehicle F is subsequently automatically steered starting from the stopping point HP up to the parking end position inside the parking garage G in accordance with the calculated lane line FSL.

In one possible embodiment, in a step S3, additional possible lane lines, in particular clothoid paths, are calculated and indicated for selection by the driver of the vehicle F. The driver selects one of the possible displayed lane lines FSL, which is subsequently executed with the automatic steering maneuver of the vehicle F in step S4.

In one possible embodiment, the lane line and/or travel curve FSL used is/are stored in a data storage unit 6. The vehicle F is then automatically steered starting from the parking end position inside the parking garage G out of the vehicle garage G in accordance with the lane line FSL read out from the data storage unit 6. In one possible embodiment of the method according to the invention, as shown in FIG. 3, a distance of the vehicle F from a wall of the parking garage G is also detected by sensors during the steering of the vehicle F. In the event that a safety distance between the vehicle F and a garage wall is fallen short of, the vehicle F is preferably automatically braked.

In one possible embodiment, different control programs for a reverse parking maneuver into a parking garage G and a forward parking maneuver into a parking garage G are stored in a program storage device of the parking assistance system 1 and can be activated by the driver. In one possible embodiment, the suitable parking control program is automatically activated as a function of the manually executed steering maneuver between the initial position I and the stopping position II. Depending on which control program has been activated, different sensors of the measuring sensor system 2 are activated and/or the sensor data thereof is evaluated by the calculation unit 3A. The vehicle F, as shown in FIG. 4, is preferably a road vehicle, for example a car or truck. In an alternative embodiment, the vehicle can also be a water vehicle, for example a sailing yacht or the like, which is controlled in a ship's cabin.

In one possible embodiment, after reaching the parking end position, a laterally available space for opening doors of the vehicle F is determined by sensors and is used to calculate a maximum opening angle for the doors of the vehicle F. In one possible embodiment, the doors are stopped on opening in this maximum calculated opening position, in order to prevent them touching the wall of the garage G. In another possible embodiment of the parking assistance system 1 according to the invention, a suitable parking end position is determined as a function of the number of persons in the vehicle F. If, for example, the vehicle F is only steered by a driver of the vehicle F and no other persons are present in the vehicle interior, the parking end position is determined such that as much space as possible is available on the driver's side to allow the driver to exit the vehicle interior. If, on the other hand, there is also a front seat passenger in the vehicle F, the vehicle is parked in the most centered parking end position possible, so that both persons can, if possible, exit the parked vehicle F without hindrance. In one possible embodiment, the occupancy and/or presence of persons inside the vehicle interior is detected by the parking assistance system 1 by means of sensors. These sensors include, for example, pressure sensors provided in the seats of the vehicle interior or a vehicle camera directed into the vehicle interior.

REFERENCE NUMERALS

1 Parking assistance system
2 Measuring sensor system
3 Control system
3A Calculation unit
3B Steering control unit
3C Braking control unit
4 Vehicle steering
5 User interface
6 Data storage unit
7 Wheel braking system
F Vehicle
G Parking garage
HP Stopping point
GT Garage depth
GB Garage width
FL Vehicle length
FB Vehicle width
FSL Lane line and/or travel curve
I Initial position
II Stopping position
III Parking end position

The invention claimed is:

1. A parking assistance system for parking a vehicle in a parking garage, comprising:
   a measuring sensor system that includes at least one sensor arranged on at least one end of the vehicle, and that is configured to measure a garage contour, a garage width and a garage depth of an interior space of the parking garage;
   a calculation unit configured to determine, from the garage contour, a relative position of the vehicle at a stopping point relative to the parking garage, and configured to calculate, based on the relative position of the vehicle and dependent on the garage width and the garage depth, at least one driving path line from the stopping point to a parking end position inside the interior space of the parking garage, in which parking end position a body of the vehicle is aligned parallel to at least one wall of the parking garage;
   a steering control unit configured to automatically steer the vehicle from the stopping point to the parking end position inside the interior space of the parking garage; and
   a user interface configured to audibly or visually indicate to a driver of the vehicle that the vehicle has reached the stopping point, wherein the stopping point is located in an entrance area of the parking garage and is marked so as to be detectable by at least one sensor of the at least one sensor of the measuring sensor system.

2. The parking assistance system according to claim 1, wherein the measuring sensor system is configured to measure the garage contour until the vehicle reaches the stopping point.

3. The parking assistance system according to claim 1, wherein the steering control unit is configured to automatically steer the vehicle from the stopping point to the parking end position in accordance with the at least one driving path line.

4. The parking assistance system according to claim 1, wherein the user interface comprises a display, the at least one driving path line includes a plurality of driving path lines, the display of the user interface is configured to display the driving path lines to the driver of the vehicle, one of the driving path lines can be selected by the driver of the vehicle, and the steering control unit is configured to automatically steer the vehicle from the stopping point to the parking end position inside the interior space of the parking garage in accordance with the selected driving path line.

5. The parking assistance system according to claim 1, further comprising a memory, wherein the calculation unit is configured to calculate the at least one driving path line further as a function of at least one of the following parameters: a measured distance between the stopping point and an entrance to the parking garage, a vehicle length of the vehicle that is stored in the memory, a vehicle width of the vehicle that is stored in the memory, and the garage contour.

6. The parking assistance system according to claim 1, further comprising a data storage unit configured to store the at least one driving path line, and wherein the steering control unit is further configured to read out the at least one driving path line from the data storage unit and based thereon to steer the vehicle from the parking end position out of the interior space of the parking garage.

7. The parking assistance system according to claim 1, wherein the user interface comprises a display unit, wherein the calculation unit is further configured to attempt to calculate the at least one driving path line, and to determine a necessary alteration of the relative position of the vehicle when it is not possible to calculate any valid driving path line to the parking end position inside the interior space of the parking garage starting from the current determined relative position of the vehicle at the stopping point, and wherein the display unit is configured to display the necessary alteration of the relative position to the driver of the vehicle.

8. The parking assistance system according to claim 1, wherein the measuring sensor system comprises at least one of an ultrasonic sensor system and a laser sensor system.

9. The parking assistance system according to claim 1, wherein the at least one sensor of the measuring sensor system comprises a sensor that is arranged on a front seat passenger's side at a rear end of the vehicle and is aligned transversely to a driving direction of the vehicle.

10. The parking assistance system according to claim 1, wherein the measuring sensor system is configured to constantly detect a distance of the vehicle from a wall of the parking garage during the automatic steering of the vehicle to the parking end position.

11. The parking assistance system according to claim 10, further comprising a braking control unit configured to automatically activate a wheel braking system of the vehicle when the distance of the vehicle from the wall of the parking garage falls below a predetermined safety distance.

12. The parking assistance system according to claim 11, further comprising a speed sensor configured to detect a speed of the vehicle, wherein the calculation unit is further configured to calculate at least one of a necessary brake retardation time and a necessary brake retardation force based on the distance of the vehicle from the wall of the parking garage and based on the speed of the vehicle in order to comply with the predetermined safety distance.

13. The parking assistance system according to claim 12, wherein the braking control unit is further configured to control the wheel braking system of the vehicle as a function of at least one of the brake retardation time and the brake retardation force.

14. The parking assistance system according to claim 1, wherein the relative position comprises an angular position of the vehicle relative to the parking garage at the stopping point.

15. A method of parking a vehicle in a parking garage, comprising the following steps performed with a parking assistance system of the vehicle:
a) measuring a garage contour of an interior space of the parking garage until the vehicle reaches a stopping point located in an entrance area of the parking garage, wherein the stopping point is marked so as to be detectable by a sensor;
b) with at least one sensor, detecting the stopping point, and measuring a garage width and a garage depth of the interior space of the parking garage;
c) with a user interface, audibly or visually indicating to a driver of the vehicle that the vehicle has reached the stopping point;
d) determining a relative position of the vehicle at the stopping point relative to the parking garage based on the garage contour;
e) calculating at least one driving path line from the stopping point to a parking end position inside the interior space of the parking garage based on the relative position of the vehicle and dependent on the garage width and the garage depth; and
f) automatically steering the vehicle from the stopping point to the parking end position inside the interior space of the parking garage in accordance with the at least one driving path line.

16. The method according to claim 15, further comprising storing the at least one driving path line in a data storage unit, and automatically steering the vehicle from the parking end position out of the interior space of the parking garage in accordance with the at least one driving path line which is read out from the data storage unit.

17. The method according to claim 15, further comprising using sensors to constantly detect an actual distance of the vehicle from a wall of the parking garage during the automatic steering, and automatically braking the vehicle when the actual distance falls below a safety distance between the vehicle and the wall of the garage.

18. The method according to claim 15, wherein the at least one driving path line is calculated further as a function of at least one of the following parameters: a measured distance between the stopping point and an entrance to the parking garage, a stored length of the vehicle, a stored width of the vehicle, and the garage contour.

19. A parking assistance system of a vehicle for automatically parking the vehicle in a parking space, comprising:
at least one sensor configured to measure in real time at least one measured parameter selected from an interior measured contour, an interior measured width and an interior measured depth of the parking space;

a calculation unit configured to determine, from the measured contour, a relative position of the vehicle relative to the parking space when the vehicle is at a stopping point at which the vehicle is at least partially outside the parking space, and configured to calculate, from the relative position and the at least one measured parameter that has been measured in real time, a driving path line from the stopping point to a parking end position in the parking space, in which parking end position the vehicle is aligned at least essentially parallel to a longitudinal boundary of the parking space;

a steering control unit configured to automatically steer the vehicle according to the driving path line from the stopping point to the parking end position in the parking space; and a user interface that is configured to audibly or visually indicate to a driver of the vehicle that the vehicle has reached the stopping point, wherein the stopping point is located in an entrance area of the parking space and is marked so as to be detectable by at least one of the at least one sensor.

\* \* \* \* \*